US011887577B2

(12) United States Patent
Pang et al.

(10) Patent No.: US 11,887,577 B2
(45) Date of Patent: Jan. 30, 2024

(54) SYSTEM AND METHOD FOR EVALUATING AN ACOUSTIC CHARACTERISTIC OF AN ELECTRONIC DEVICE

(71) Applicant: Huawei Technologies Co., Ltd., Shenzhen (CN)

(72) Inventors: Liyun Pang, Munich (DE); Fons Adriaensen, Munich (DE); Roman Schlieper, Hannover (DE); Song Li, Hannover (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

(21) Appl. No.: 17/464,286

(22) Filed: Sep. 1, 2021

(65) Prior Publication Data

US 2021/0398515 A1 Dec. 23, 2021

Related U.S. Application Data

(63) Continuation of application No. PCT/EP2019/055212, filed on Mar. 1, 2019.

(51) Int. Cl.
*G10K 11/178* (2006.01)
*H04R 1/10* (2006.01)

(52) U.S. Cl.
CPC .... *G10K 11/17881* (2018.01); *G10K 11/1785* (2018.01); *H04R 1/1008* (2013.01); *H04R 2460/01* (2013.01)

(58) Field of Classification Search
CPC .......... G10K 11/17881; G10K 11/1785; H04R 1/1008; H04R 2460/01
USPC .............................................. 381/60; 73/585
See application file for complete search history.

(56) References Cited

U.S. PATENT DOCUMENTS

| | | | |
|---|---|---|---|
| 8,798,283 B2 | 8/2014 | Gauger, Jr. et al. | |
| 9,020,160 B2 | 4/2015 | Gauger, Jr. | |
| 9,301,040 B2 | 3/2016 | Annunziato et al. | |
| 2014/0044275 A1 | 2/2014 | Goldstein et al. | |
| 2014/0126735 A1* | 5/2014 | Gauger, Jr. ...... | G10K 11/17837 381/71.6 |

(Continued)

OTHER PUBLICATIONS

Roman Schlieper, Estimation of the Headphone "Openness" based on Measurements of Pressure Division Ration, Headphone Selection Criterion and Acoustic Impedance Curve, Oct. 2018 (Year: 2018).*

(Continued)

*Primary Examiner* — Norman Yu
(74) *Attorney, Agent, or Firm* — Leydig, Voit & Mayer, Ltd.

(57) ABSTRACT

The present disclosure provides a method for evaluating an electronic device. The method comprises determining, with an acoustic tube, a value of a first parameter, the value of the first parameter being indicative of the acoustic impedance of a reference termination. The method further comprises determining, with the acoustic tube, a value of a second parameter, the value of the second parameter being indicative of the acoustic impedance of the reference termination, when occluded by the electronic device. The method then comprises calculating a value of a third parameter, the value of the third parameter being indicative of the acoustic impedance of the electronic device, based on the value of the first parameter and the value of the second parameter.

14 Claims, 12 Drawing Sheets

(56) References Cited

U.S. PATENT DOCUMENTS

| | | | |
|---|---|---|---|
| 2016/0210958 | A1 | 7/2016 | Gauger, Jr. et al. |
| 2017/0148428 | A1 | 5/2017 | Thuy et al. |

OTHER PUBLICATIONS

Schlieper et al., "Estimation of the Headphone "Openness" based on Measurements of Pressure Division Ratio, Headphone Selection Criterion and Acoustic Impedance Curve," Audio Engineering Society, Convention Paper 10099, Presented at the 145th Convention, New York, NY, USA, total 10 pages (Oct. 17-20, 2018).
Liebich et al., "Active Cancellation of the Occlusion Effect in Hearing Aids by Time Invariant Robust Feedback," 2016 VDE Verlag GMBH, Berlin, Offenbach, pp. 135-139 (2016).
Schlieper et al., "Development and validation of a full audio range acoustic impedance tube," Audio Engineering Society, Convention e-Brief 443, Presented at the 144th Convention, Milan, Italy, total 4 pages (May 23-26, 2018).
Liebich et al., "Active Occlusion Cancellation with Hear-Through Equalization for Headphones," 2018 IEEE International Conference on Acoustics, Speech and Signal Processing, (ICASSP), Calgary, total 5 pages (Apr. 2018).
Vorländer "Acoustic load on the ear caused by headphones," 2000 Acoustical Society of America, pp. 2082-2088 (Apr. 2000).
"Acoustics—Determination of sound absorption coefficient and impedance in impedance tubes—Part 2:Transfer-function method Acoustique—Dëtermination du facteur d'absorption acoustique et de l'impédance des tubes d'impédance—Partie 2: Méthode de la fonction de transfert," International Standard ISO 10534-2, (First edition Nov. 15, 1998) Reviewed and confirmed in 2015, total 33 pages.

* cited by examiner

SYSTEM AND METHOD FOR EVALUATING AN ACOUSTIC CHARACTERISTIC OF AN ELECTRONIC DEVICE

CROSS-REFERENCE TO RELATED APPLICATION

This application is a continuation of International Application No. PCT/EP2019/055212, filed on Mar. 1, 2019, the disclosure of which is hereby incorporated by reference in its entirety.

TECHNICAL FIELD

The present disclosure relates generally to the field of headphones. In particular, it relates to the fields of configuration and the quality control of ANR/ANC headphones. In this technical field the disclosure proposes a method for evaluating ANR/ANC headphones. For example, the quality of the ANR/ANC headphones may be determined. This disclosure also proposes a system comprising an acoustic impedance tube for evaluating and configuring ANR/ANC headphones.

BACKGROUND

Headphones are often worn in urban and public environments, where high noise levels surround a user. Therefore, acoustically closed headphones are preferred to attenuate the outside noise as much as possible and to achieve a good audio reproduction quality due to a better signal to noise ratio. Closed headphones, especially the "intra-aural" (in-ear) and the "intra-concha" (earbud) headphones which seal the ear canal, are likely to increase the acoustic impedance seen from the inside of the ear canal to the outside. An increased acoustic impedance may be followed by an increased sound pressure level for the low frequencies inside the ear canal. In the case of the self-generated sound, e.g., speaking, rubbing and buzzing noise, the perceived sound feels unnaturally amplified and reduces the comfort while listening and/or speaking. This effect is commonly described as the occlusion effect. FIG. 12 shows this effect by comparing two sound pressure level spectra measured inside the ear canal. The dashed curve 1202 shows the sound pressure for the un-occluded open ear. The solid curve 1201 shows the sound pressure level inside the ear canal of the same subject wearing circumaural (over-ear) headphones. From FIG. 12 it can be derived that the sound pressure level is increased in the frequency range between 60 Hz and 400 Hz.

Conventionally, in order to counteract the problem of the occlusion effect, two common approaches are used. One conventional approach to counteract the occlusion effect is to use small ducts, which connect the inside of the ear canal to the environment of the user (i.e., the passive solution). The other conventional approach is to use the headphones, which have one or more microphones inside and outside the headphone cup, and an electronic circuit to actively cancel out the increased sound pressure level. This method is called Active Noise Cancellation (ANC) or Active Noise Reduction (ANR).

In general, there are three different ANR/ANC algorithms as follow:

a) Feedforward active noise cancellation (in this method, the reference microphone is outside the ear cup): the microphone captures the noise before the person hears. The ANC then processes the noise and creates the anti-noise before sending the resulting signal to the headset speaker. The disadvantage of this method is that it works within a narrower range of frequencies.

b) Feedback active noise cancellation (in this method, the reference microphone is inside the ear cup): the microphone is put inside the ear cup and in front of the speaker, so it captures the resulting signal in the same way the listener does. However, it has the disadvantage that, it can't deal with the higher-frequency sounds.

c) Hybrid active noise cancellation (in this method, a pair of reference microphones are outside and inside the ear cup): it is a hybrid approach takes the best of both methods, i.e., combining the feedforward and the feedback ANC by placing a pair of microphones on the inside and outside of the ear cup.

A number of solutions are suggested regarding configuration of the ANC/ANR headphone filters and reduction of the occlusion effect, however, these methods are time-consuming, and the exact repositioning of the microphones in the ear canal are difficult.

SUMMARY

In view of the above-mentioned problems and disadvantages, the present disclosure aims to improve the conventional devices and methods described above. Thereby, an objective is in particular to provide a system and a method for improved evaluation (e.g., configuring, calibrating, etc.) of an electronic device. The method and system should be applicable to the configuration of an ANR/ANC headphone (for feedback ANR/ANC or hybrid ANR/ANC systems). Moreover, in contrast to the conventional methods using miniature microphones in the ear canal of a human test subject, who has to speak during the measurement, the method and system of this disclosure should not be limited to the excitation bandwidth of the test person. In addition, the measurement results should be repeatable, and in some cases may be highly repeatable. The configuration process of the ANR/ANC system should moreover be much faster, and the quality of the resulting accuracy regarding the occlusion reduction should be increased.

The objective of the present disclosure is achieved by the solution provided in the enclosed independent claims. Advantageous implementations of the present disclosure are further defined in the dependent claims.

A first aspect of the disclosure provides a method for evaluating an electronic device, the method comprising determining, with an acoustic tube, a value of a first parameter, the value of the first parameter being indicative of the acoustic impedance of a reference termination; determining, with the acoustic tube, a value of a second parameter, the value of the second parameter being indicative of the acoustic impedance of the reference termination, when occluded by the electronic device; and calculating a value of a third parameter, the value of the third parameter being indicative of the acoustic impedance of the electronic device, based on the value of the first parameter and the value of the second parameter.

For example, the electronic device may be a hearing device, e.g., a headphone. Moreover, the headphone may include an ANR system, an ANC system or a hybrid ANR/ANC system (hereinafter also referred to ANR/ANC circuit). In some embodiments, the acoustic impedance of the ANR/ANC headphones may be determined and the headphone may be configured. For example, the configuration of the ANR/ANC system (e.g., for the feedback filter of the ANR/ANC or the hybrid ANR/ANC systems) may be provided based on the measurement results of the acoustic impedance of headphones.

The first aspect of the disclosure has the advantage that it is not limited to the excitation bandwidth of the test person, and that the measurement results are highly repeatable. Furthermore, the configuration process of an ANR/ANC system may be faster, and in some cases may be much faster, than conventionally, and the quality of the resulting accuracy regarding the occlusion reduction is higher.

In an implementation form of the first aspect, the value of third parameter is calculated based on the ratio between the value of the first parameter and the value of the second parameter.

In a further implementation form of the first aspect, the method further comprises calculating a value of a fourth parameter as Occlusion Index, OI, based on the value of the third parameter, wherein the value of the OI represents the strength of the acoustic impedance of the electronic device with respect to the occlusion effect.

This is beneficial, since the configuration of the feedback filter of an ANR/ANC headphone may be provided, which may automatically reach an optimized reduction of the occlusion effect.

In a further implementation form of the first aspect, the reference termination is an open end of the tube, or an artificial ear, or a dummy head.

In a further implementation form of the first aspect, the electronic device comprises an Active Noise Cancellation, ANC, headphone, or an Active Noise Reduction, ANR, headphone.

For example, the evaluation time of the ANR/ANC filter may be decreased, e.g., in the development process which may yield to more precise measurement results.

In a further implementation form of the first aspect, the method further comprises selecting, based on the value of the OI, a frequency dependent weighting factor, K1, for a feedback filter of the electronic device, when the value of the OI is larger than a threshold value; applying the K1 to the electronic device; and recalculating the value of the fourth parameter as OI, after applying the K1 to the electronic device.

This is beneficial, since a reproducible, broadband measurement result may be determined, which may yield in a faster development loop and a better results over different subjects.

In a further implementation form of the first aspect, selecting the K1, applying the K1, and recalculating the value of the fourth parameter as OI is performed iteratively, wherein the iterative performing is done until the recalculated value of the OI is equal to or smaller than the threshold value.

For example, in some embodiments, a reproducible results which may yield in a faster development loop and better results over different subjects may be provided. Moreover, in some embodiments, it may be used for different headphone.

In a further implementation form of the first aspect, the method further comprises measuring a first transfer function value between an external loudspeaker and an additional microphone, wherein the additional microphone is placed inside the reference termination; measuring a second transfer function value between the external loudspeaker and the additional microphone; and calculating a value of a fifth parameter, the value of the fifth parameter being indicative of the damping of the electronic device, based on the first transfer function value and the second transfer function value.

In a further implementation form of the first aspect, the method further comprises selecting, when calculating a value of the OI larger than the threshold value, a frequency dependent weighting factor, K2, for a feedforward filter of the electronic device, based on the value of the fifth parameter; applying the K2 to the electronic device; and recalculating the value of the fourth parameter as OI and the value of the fifth parameter, after applying the K2 to the electronic device.

This is beneficial, since feedforward filter may be configured.

In a further implementation form of the first aspect, selecting the K2, applying the K2, and recalculating the value of the fourth parameter as OI and the value of the fifth parameter is performed iteratively, wherein the iterative performing is done until the recalculated value of the OI is equal to or smaller than the threshold value.

In a further implementation form of the first aspect, the first transfer function value is measured by producing a signal using the external loud speaker and capturing the signal by the additional microphone.

In a further implementation form of the first aspect, the second transfer function value is measured by reproducing the signal using the external loud speaker and capturing the reproduced signal by the additional microphone.

A second aspect of the disclosure provides a system for evaluating an electronic device, the system comprising an acoustic tube configured to determine a value of a first parameter, the value of the first parameter being indicative of the acoustic impedance of a reference termination; and determine a value of a second parameter, the value of the second parameter being indicative of the acoustic impedance of the reference termination, when occluded by the electronic device; and a processing unit configured to calculate a value of a third parameter, the value of the third parameter being indicative of the acoustic impedance of the electronic device, based on the value of the first parameter and the value of the second parameter.

In an implementation form of the second aspect, the system further comprising an electronic device, wherein the electronic device comprises at least one loudspeaker configured to generate a signal, at least one microphone configured to capture the generated signal from the loudspeaker, and an Active Noise Cancellation, ANC, circuit and/or an Active Noise Reduction, ANR, circuit; configured to generate a noise cancelation signal.

This is beneficial, since it may be possible to configure an active noise reducing headphone.

In a further implementation form of the second aspect, the acoustic impedance tube has a full audio band frequency range.

For example, in some embodiments, the full audio bandwidth or a specific frequency range, e.g., 20 Hz to 20 kHz may be used.

In a further implementation form of the second aspect, the system further comprising an external loudspeaker configured to generate a signal; an additional microphone configured to capture the generated signal, wherein the additional microphone is placed inside the acoustic tube and at a predefined distance from the end of the acoustic tube; and a damping measurement circuit configured to measure the first transfer function value and/or the second transfer function value.

In a further implementation form of the second aspect, the predefined distance between the additional microphone and the end of the acoustic tube is smaller than 5 cm.

In a further implementation form of the second aspect, the value of third parameter is calculated based on the ratio between the value of the first parameter and the value of the second parameter.

In a further implementation form of the second aspect, the system is further configured to calculate a value of a fourth parameter as Occlusion Index, OI, based on the value of the third parameter, wherein the value of the OI represents the strength of the acoustic impedance of the electronic device with respect to the occlusion effect.

In a further implementation form of the second aspect, the reference termination is an open end of the tube, or an artificial ear, or a dummy head.

In a further implementation form of the second aspect, the electronic device comprises an Active Noise Cancellation, ANC, headphone, or an Active Noise Reduction, ANR, headphone.

In a further implementation form of the second aspect, the system is further configured to select, based on the value of the OI, a frequency dependent weighting factor, K1, for a feedback filter of the electronic device, when the value of the OI is larger than a threshold value; apply the K1 to the electronic device; and recalculate the value of the fourth parameter as OI, after applying the K1 to the electronic device.

In a further implementation form of the second aspect, selecting the K1, applying the K1, and recalculating the value of the fourth parameter as OI is performed iteratively, wherein the iterative performing is done until the recalculated value of the OI is equal to or smaller than the threshold value.

In a further implementation form of the second aspect, the system is further configured to measure a first transfer function value between an external loudspeaker and an additional microphone, wherein the additional microphone is placed inside the reference termination; measure a second transfer function value between the external loudspeaker and the additional microphone; and calculate a value of a fifth parameter, the value of the fifth parameter being indicative of the damping of the electronic device, based on the first transfer function value and the second transfer function value.

In a further implementation form of the second aspect, the system is further configured to select, when calculating a value of the OI larger than the threshold value, a frequency dependent weighting factor, K2, for a feedforward filter of the electronic device, based on the value of the fifth parameter; apply the K2 to the electronic device; and recalculate the value of the fourth parameter as OI and the value of the fifth parameter, after applying the K2 to the electronic device.

In a further implementation form of the second aspect, selecting the K2, applying the K2, and recalculating the value of the fourth parameter as OI and the value of the fifth parameter is performed iteratively, wherein the iterative performing is done until the recalculated value of the OI is equal to or smaller than the threshold value.

In a further implementation form of the second aspect, the first transfer function value is measured by producing a signal using the external loud speaker and capturing the signal by the additional microphone.

In a further implementation form of the second aspect, the second transfer function value is measured by reproducing the signal using the external loud speaker and capturing the reproduced signal by the additional microphone.

The system of the second aspect and its implementation forms achieve the same advantages and effects as described above for the method of the first aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTION OF THE EMBODIMENTS

Figure 1:
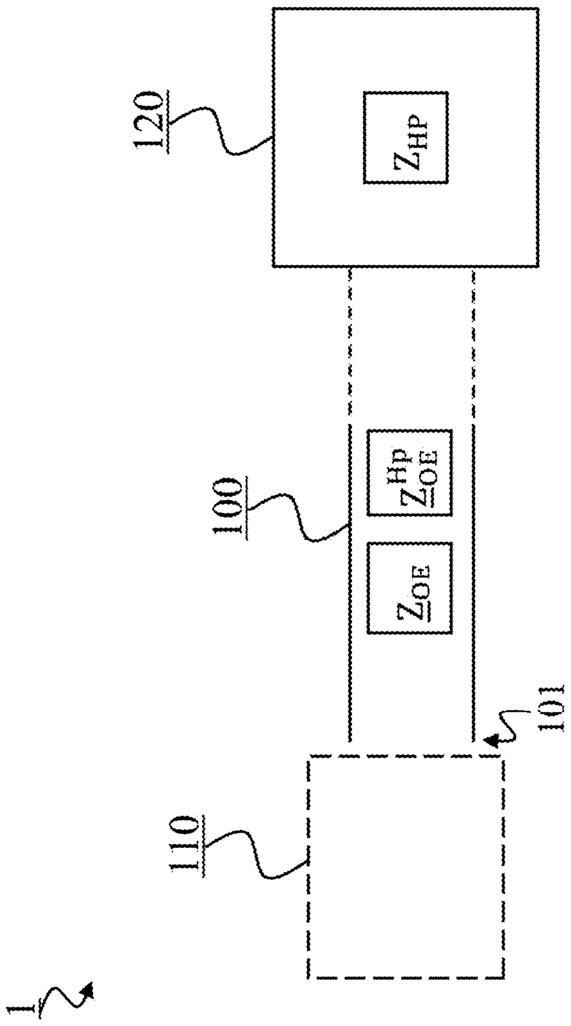
FIG. 1 schematically illustrates a system for evaluating an electronic device, according to various embodiments of the disclosure.

FIG. 1 schematically illustrates a system 1 for evaluating an electronic device 110, according to various embodiments of the disclosure.

The system 1 comprises an acoustic tube 100 configured to determine a value of a first parameter $\underline{Z}_{OE}$ the value of the first parameter $\underline{Z}_{OE}$ being indicative of the acoustic impedance of a reference termination 101; and determine a value of a second parameter $\underline{Z}_{OE}^{Hp}$, the value of the second parameter $\underline{Z}_{OE}^{Hp}$ being indicative of the acoustic impedance of the reference termination 101, when occluded by the electronic device 110.

The system 1 further comprises a processing unit 120 configured to calculate a value of a third parameter $Z_{HP}$, the value of the third parameter $Z_{HP}$ being indicative of the acoustic impedance of the electronic device 110, based on the value of the first parameter $\underline{Z}_{OE}$ and the value of the second parameter $\underline{Z}_{OE}^{Hp}$.

For example, the electronic device 110 may be the ANR/ANC headphone 110. Moreover, the acoustic impedance of the ANR/ANC headphones 110 may be determined. Furthermore, in some embodiments, the feedback filter and/or the feedforward filter of the ANR/ANC headphone may be configured. Moreover, the ANR/ANC headphone 110 may be evaluated, calibrated, etc.

Figure 2:
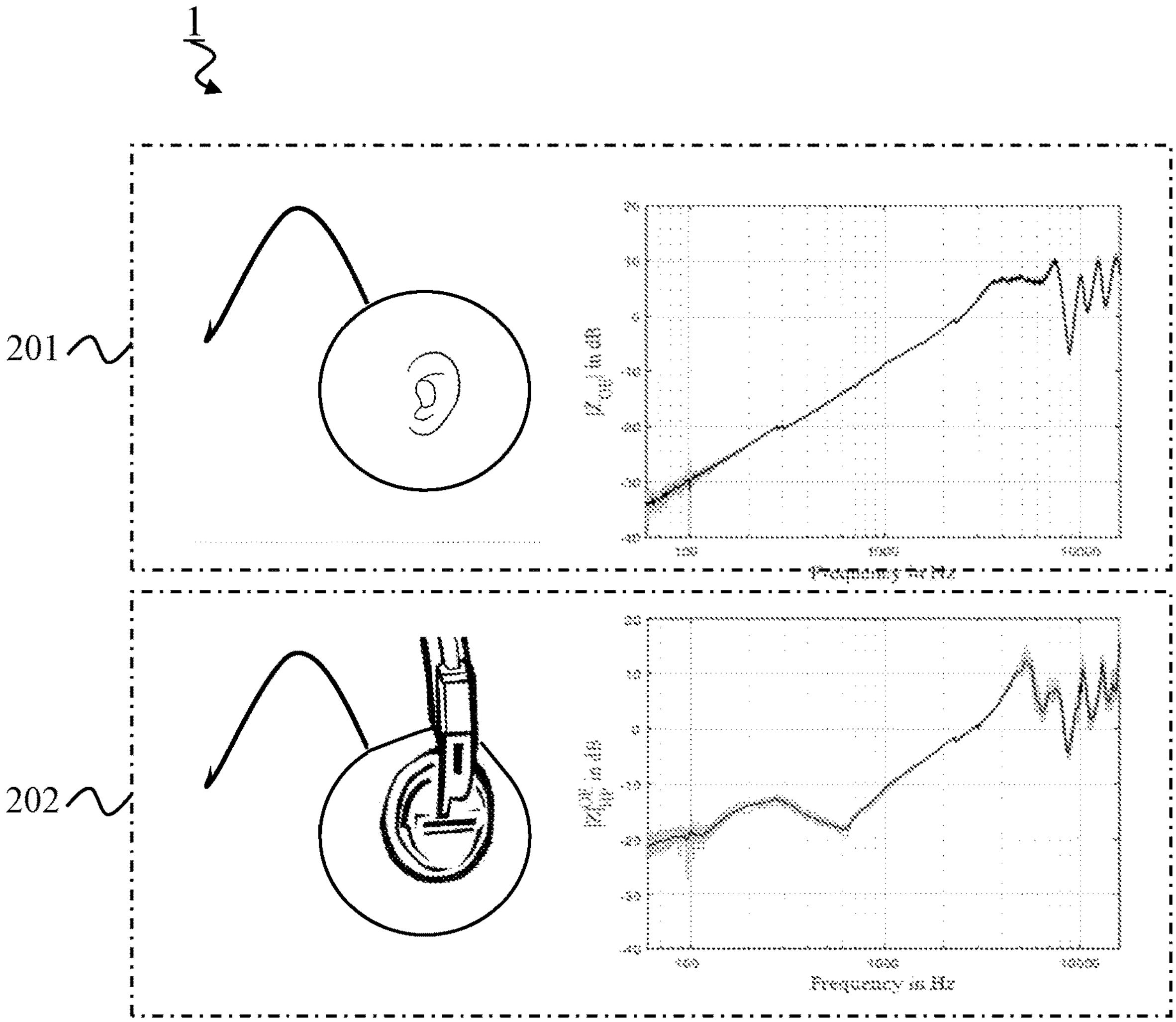
FIG. 2 schematically illustrates a system for evaluating a headphone, according to various embodiments of the disclosure.

FIG. 2 schematically illustrates the system 1 for evaluating a headphone, according to various embodiments of the disclosure.

The acoustic impedance of the headphones may be measured with a customized acoustic impedance tube, which may be based on the ISO-10534-2. The measurement tube may be designed and built such that it fits the geometries of a human ear canal, e.g., the inner diameter of the tube may be approx. 8 mm, and a frequency range between at least 60 Hz and 2 kHz. The determination of the acoustic impedance of the headphone may be done with 2 measurements. First, the acoustic impedance of the reference termination $\underline{Z}_{OE}$ (i.e., the value of the first parameter) has to be measured (e.g., the system 1 in measuring set-up 201). The reference termination may be the "open-ended" tube or an artificial ear of a dummy head. Moreover, if an artificial ear is used, in some embodiments, it may lead to a better results. Note that, care must be taken to ensure that the inner diameter of the measuring tube corresponds to the inner diameter of the artificial ear. Second, the acoustic impedance of the reference termination occluded with the headphone $\underline{Z}_{OE}^{Hp}$ (i.e., the value of the second parameter) has to be measured (e.g., the system 1 in measuring set-up 202). The headphone impedance $Z_{HP}$ (i.e., the value of the third parameter) may be defined as the normalization of $\underline{Z}_{OE}^{Hp}$ to $\underline{Z}_{OE}$, as follows:

$$Z_{HP} = \frac{|Z_{OE}^{Hp}|}{|Z_{OE}|}, \quad (1)$$

This headphone impedance shows the impact of the headphone as the deviation to the reference impedance. An ideal open headphone may have a $Z_{HP}$ equal to 0 dB in all frequency bins.

Figure 3:
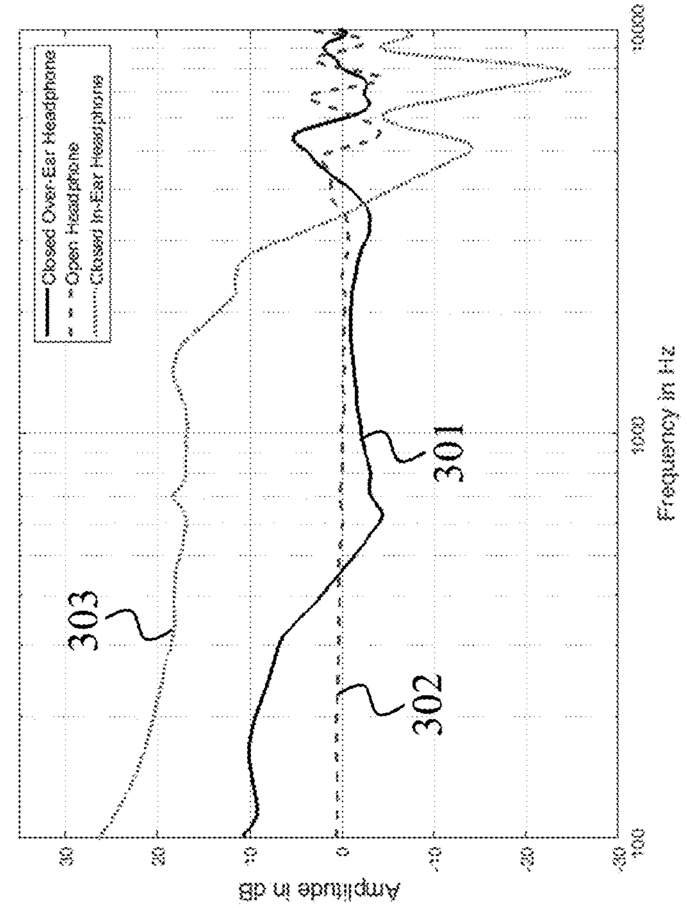
FIG. 3 illustrates the determined headphone impedance for three different headphones without any ANR/ANC system, according to various embodiments of the disclosure.

FIG. 3 illustrates the determined headphone impedance for three different headphones without any ANR/ANC system, according to various embodiments of the disclosure.

The headphone impedance are determined for a closed over-ear headphone 301, an open headphone 302, and a closed in-ear headphone 303, in the frequency range between 100 Hz and 10000 Hz.

Figure 12:
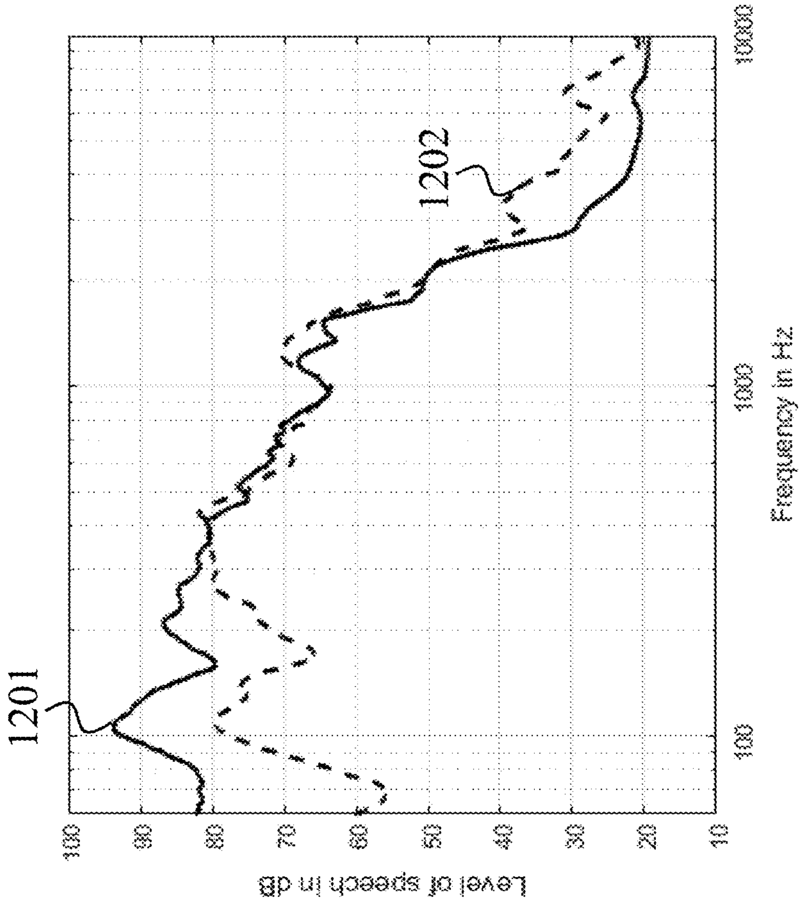
FIG. 12 illustrates the occlusion effect by comparing two sound pressure level spectra measured inside the ear canal, according to prior art.

In some embodiments, the Occlusion Index (OI) may be determined and it may further be used to represent the strength of the acoustic impedance regarding the occlusion effect with a single value. For example, the OI (i.e., the value of the fourth parameter) may be calculated as follows:

$$OI = 20\log_{10}\left(\sqrt{\frac{\sum_{i=f_l}^{f_u}(Z_{HP}(i)-1)^2}{N}+1}\right)\text{ in dB}, \quad (2)$$

where N is the number of frequency bins between the lower frequency limit $f_l$ and the upper frequency limit $f_u$. In some embodiments, $f_l$ may be between 20 Hz and 100 Hz, $f_u$ may be between 800 Hz and 2000 Hz. N may depend on the frequency resolution (Δf), which may be calculated as $(f_u-f_l)/\Delta f+1$. For example, if $f_l$ is equal 60 Hz, $f_u$ is equal to 1000 Hz, and the Δf is 1 Hz, N is equal to (1000 Hz-60 Hz)/1 Hz+1=941. The frequency limits may be based on the lower frequency limit of the acoustic impedance tube and the upper frequency limit, which may be defined up to 2 kHz. Typically, the occlusion effect is most pronounced in the low frequencies and decreases as frequency increases, depending on the design of the headphone. For circumaural (over-ear) headphones (e.g., as it is shown in FIG. 12) the occlusion effect is dominant up to 400 Hz. Moreover, for an in-ear headphone the occlusion effect may be extended up to 2 kHz.

In some embodiments, the acoustic impedance tube may be used, and different parameters may be determined and/or calculated (e.g., $Z_{HP}$, OI), in order to iteratively configure the ANR/ANC system of the headphone.

In some embodiments the repeatable measurement for determining and/or reducing the occlusion effect may performed, e.g., by using the acoustic impedance tube, and the ANR/ANC Headphone may be configured, evaluated, etc.

Figure 4:
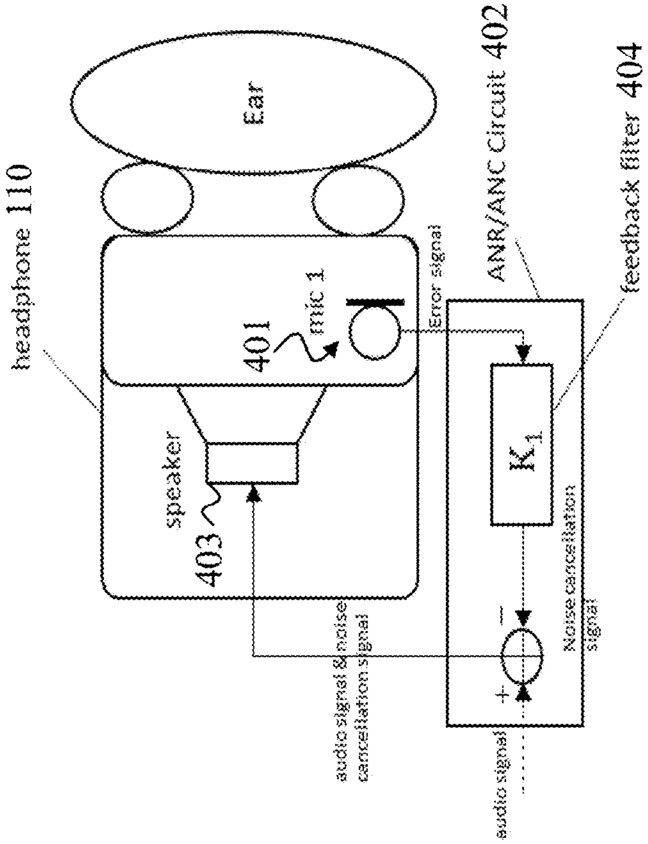
FIG. 4 illustrates an exemplarily scheme of one side of the ANR/ANC headphone, according to various embodiments of the disclosure.

FIG. 4 illustrates an exemplarily scheme of one side of the ANR/ANC headphone 110, according to various embodiments of the disclosure.

An example of one side of a typical ANR/ANC headphone 110 is illustrated, which consists of a microphone 401, an ANR/ANC circuit 402 and a loudspeaker 403. The microphone 401 captures the generated sound from the user, the ANR/ANC circuit 402 contains the ANR/ANC controller $K_1$ with a frequency-dependent weighting to generate the cancellation signal which is played back by the loudspeaker 403. $K_1$ is a frequency dependent gain factor for the feedback filter 404.

In the design process of the ANR/ANC system 1 using the acoustic impedance tube 100, it may be possible to set this gain factor (e.g., very precisely to the correct value) which may lead to a better reduction of the occlusion effect and an optimal noise reduction properties. Moreover, in some embodiments, $K_1$ may be configured (e.g., selected, adjusted, etc.) by an iterative process.

Figure 5:
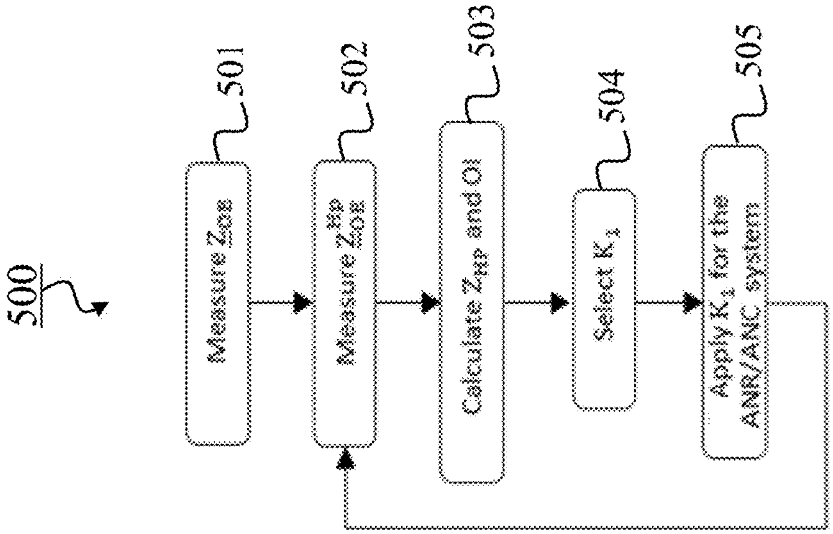
FIG. 5 schematically illustrates a flow chart of a procedure for evaluating the ANR/ANC headphone based on calculating the OI and applying $K_1$ for the feedback filter, according to various embodiments of the disclosure.

FIG. 5 schematically illustrates a flow chart of a procedure 500 for evaluating the ANR/ANC headphone 110 based on calculating the OI and applying $K_1$ for the feedback filter, according to various embodiments of the disclosure.

Moreover, the following steps may be performed:

Step 501: measure the $\underline{Z}_{OE}$ on the acoustic impedance tube as the reference termination.

Step 502: measure the $\underline{Z}_{OE}^{Hp}$ on the acoustic impedance tube with ANR/ANC system. It should be noted, at the beginning, the feedback loop gain ($K_1$) are zero.

Step 503: calculate the $Z_{HP}$ as the ratio between $|\underline{Z}_{OE}^{Hp}|$ and $|\underline{Z}_{OE}|$, and further calculate the OI based on the $Z_{HP}$. OI is a criterion to evaluate the performance of the ANR/ANC system 1. If the OI is equal or close to zero, or blow a threshold defined by the manufacturer, the measurement is completed (e.g., the headphone is calibrated), there is no need to go to steps 504 and 505 anymore.

Step 504: select frequency dependent weighting factor for the ANR/ANC controller $K_1$. For example, if $Z_{HP}$ shows 10 dB boost at 100 Hz, want 10 dB of feedback loop desensitivity at that frequency.

Step 505: apply $K_1$ for the ANR/ANC circuit 402 and go back to step 502.

Figure 6:
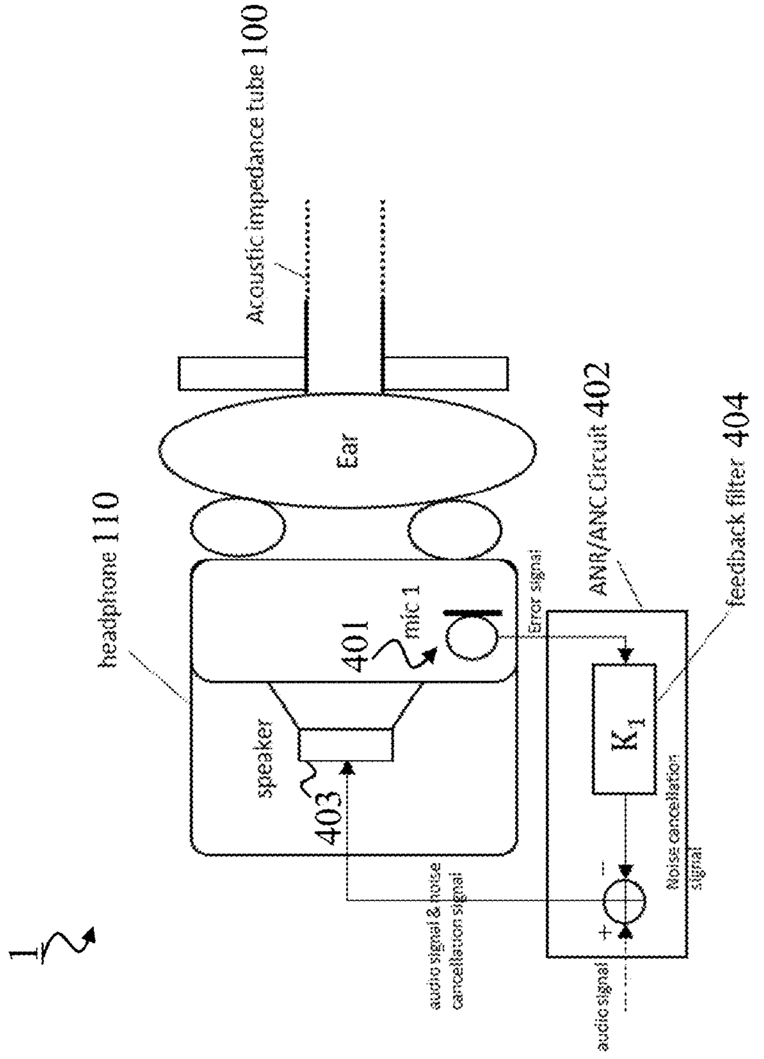
FIG. 6 illustrates an exemplarily scheme of the system including the acoustic impedance tube and the headphone with ANR/ANC system, according to various embodiments of the disclosure.
Figure 7:
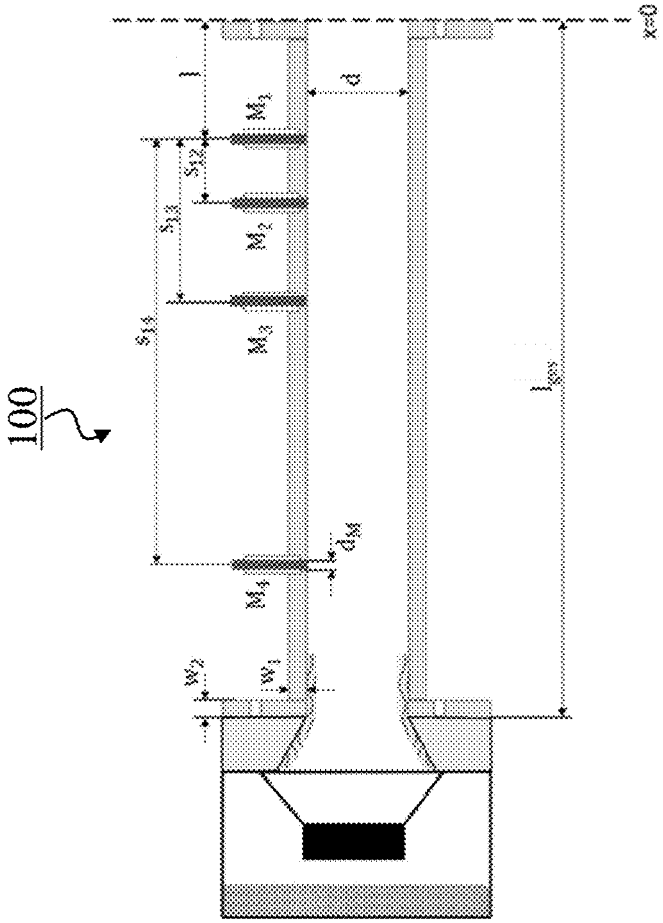
FIG. 7 schematically illustrates an exemplarily acoustic impedance tube, according to various embodiments of the disclosure.

FIG. 6 illustrates an exemplarily scheme of the system 1 including the acoustic impedance tube 100 and the headphone 110 with ANR/ANC circuit 402, according to various embodiments of the disclosure. Moreover, FIG. 7 schematically illustrates an exemplarily acoustic impedance tube 100, according to various embodiments of the disclosure.

Moreover, the system 1 (e.g., the measurement setup) and/or the acoustic impedance tube 100 may have the following configurations:

The acoustic impedance tube 100 may be based on the ISO-10534-2.

The number of microphones and the distances between different microphones may be selected based on the desired frequency range.

For example, two microphones with a distance of 28 cm may achieve the measurement range between 60 Hz-600 Hz.

The distance between the end of the tube and the position of the first (nearest to the end of the tube) microphone should be no larger than 5 cm (e.g., for example, it may be less than 2 cm).

To achieve a wider frequency range, more than 2 microphone positions may be needed (e.g., four microphone positions are shown in the FIG. 7).

In some embodiments, the feedback filter 404 and/or the feedforward (hear-through) filter 804 may be configured with the system 1 including the acoustic impedance tube 100 and/or the method discussed above. Moreover, an additional hear-through filter and an external loudspeaker 903 may be used.

In some embodiments, a feed forward path combined with a feedback path may be provided, for example, to ensure a natural hear-through feeling with optimized occlusion reduction. Natural hear-through means that the ambient noise and the user's own voice while speaking is perceived naturally (like without using headphones). Moreover, in order to ensure a natural perception, not only the occlusion effect has to be reduced/cancelled, the passive attenuation/damping of the headphone in the high frequencies has to be compensated.

Figure 8:
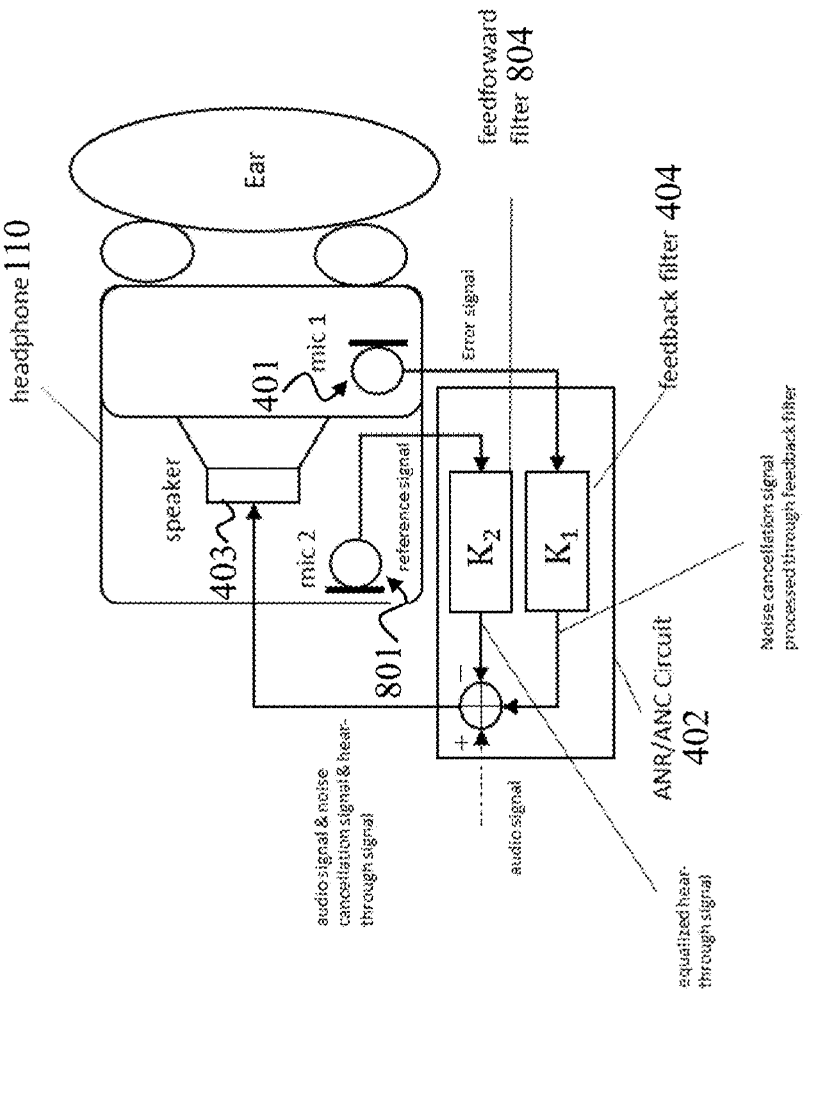
FIG. 8 illustrates an exemplarily scheme of the ANR/ANC headphone comprising a feedback microphone path and a feedforward microphone path, according to various embodiments of the disclosure.

FIG. 8 illustrates an exemplarily scheme of the ANR/ANC headphone 110 comprising a feedback microphone path and a feedforward microphone path, according to various embodiments of the disclosure.

FIG. 8 illustrates the headphone 110 with a feedback microphone 401 path and a feedforward microphone 801 path. Both microphone paths are connected to the ANR/ANC circuit 402 and have different frequency dependent weighting functions $K_1$, $K_2$, respectively. Moreover, it may be possible to adjust $K_2$ (frequency dependent gain factor for the feedforward filter 804), and it may also be possible to adjust $K_1$ and $K_2$ together, for example, by updating their values iteratively in order to find the best balance of the ambient response and the occlusion effect. Therefore, the headphones may be placed on the acoustic impedance tube 100 and an additional loudspeaker (e.g., speaker2 903) is placed approx. 1 m away of the headphone (e.g., in FIG. 9).

Figure 9:
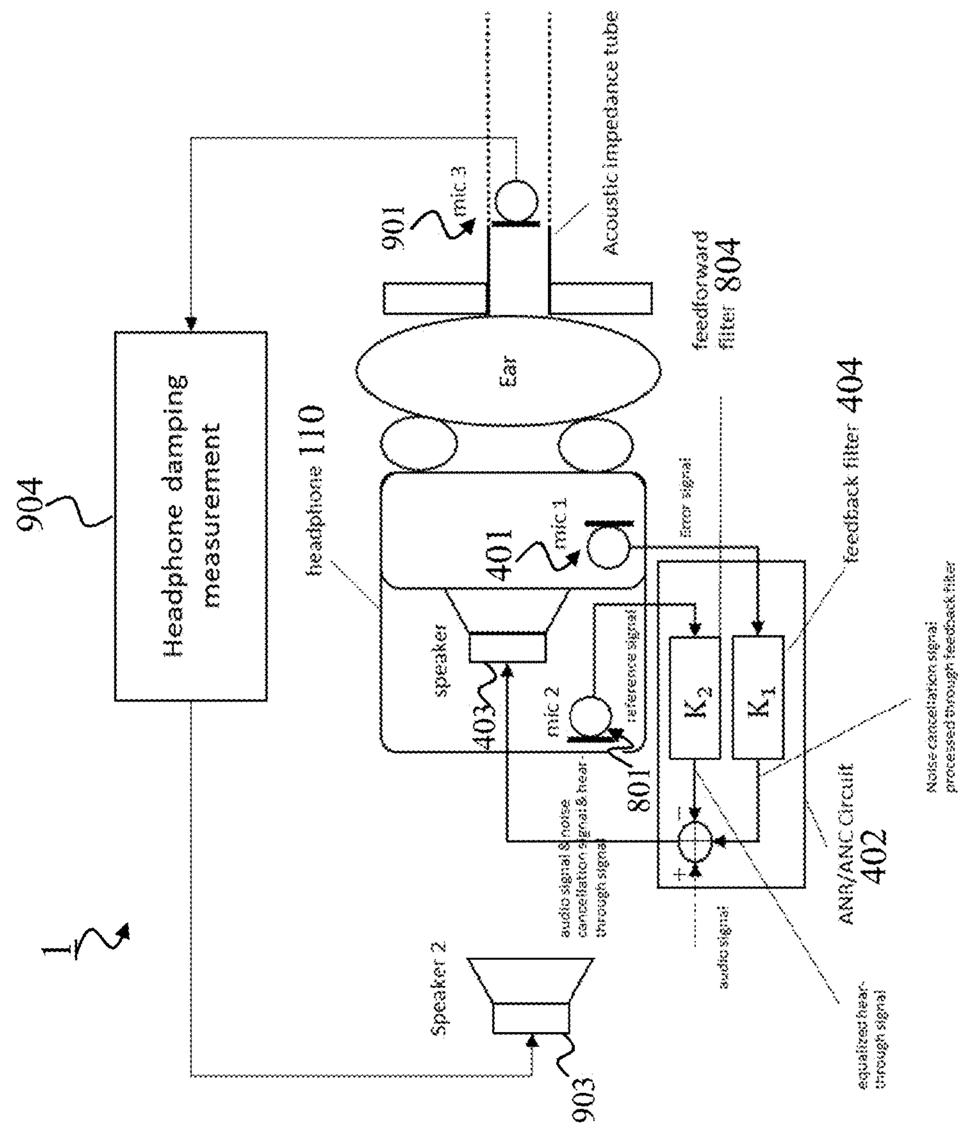
FIG. 9 illustrates an exemplarily scheme of the system comprising an additional microphone and an external loudspeaker for evaluating the ANR/ANC headphone, according to various embodiments of the disclosure.

FIG. 9 illustrates an exemplarily scheme of the system 1 comprising an additional microphone 901 and an external loudspeaker 903 for evaluating the ANR/ANC headphone 110, according to various embodiments of the disclosure.

Moreover, the additional microphone 901 (nearest to the end of the tube, mic 3) inside the acoustic impedance tube 100 may be used and the frequency depending damping of the headphone may be measured. Therefore, the external speaker 903 (speaker2) and the additional microphone 901 (mic 3) are connected to the box headphone damping measurement 904. To measure the headphone damping, a measurement signal is reproduced via the external speaker 903 (i.e., the speaker 2) that is picked up by the additional microphone 901 (mic 3), for the covered impedance tube with headphone and without headphone. Furthermore, the ratio between the signals (covered/uncovered) may be the frequency dependent damping factor of the headphone 110. In addition, it may be possible to compensate the damping of the headphone 110 in the high frequency part above 1-2 kHz. For example, the measurement may be performed in two operation modes: The first operation mode may measure the acoustic impedance of the headphone 110 as it is described above (e.g., under FIG. 5 and/or FIG. 6). The second operation mode may measure the headphone damping with the external loud speaker 903 (speaker2) and the additional microphone 901 (mic 3), as it is illustrated in FIG. 9.

Figure 10:
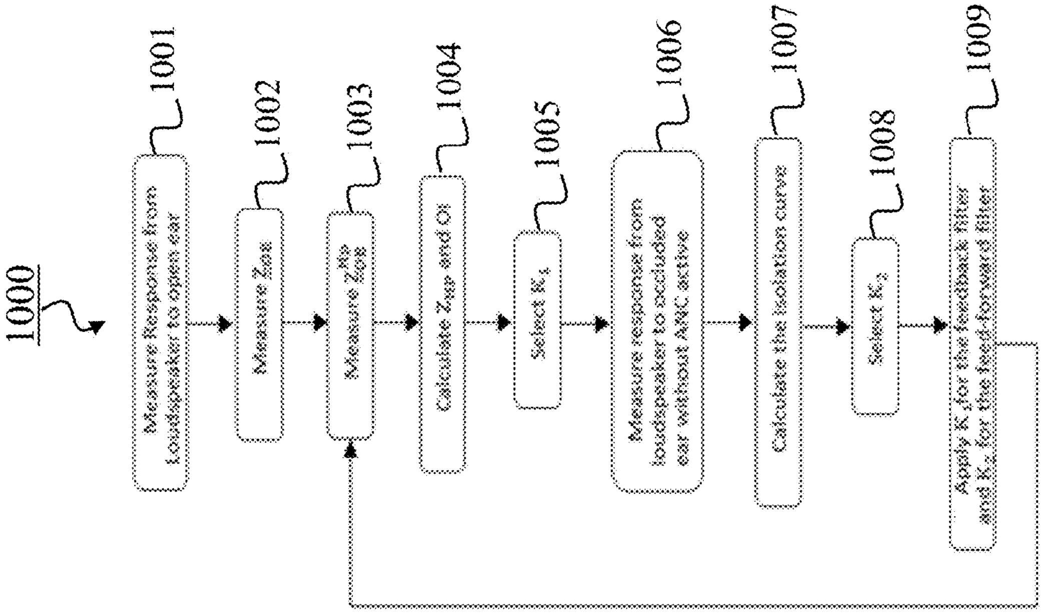
FIG. 10 schematically illustrates a flow chart of a procedure for evaluating the ANR/ANC headphone based on calculating the OI, applying $K_1$ for the feedback filter and $K_2$ for the feedforward filter, according to various embodiments of the disclosure.

Moreover, the feedback and feed-forward paths may be configured, for example, using the system in FIG. 9 and/or the procedure 1000 in FIG. 10.

FIG. 10 schematically illustrates a flow chart of a procedure 1000 for evaluating the ANR/ANC headphone 110 based on calculating the OI, applying $K_1$ for the feedback filter, and applying $K_2$ for the feedforward filter, according to various embodiments of the disclosure.

Moreover, the following steps may be performed:

Step 1001: measure transfer function ($H_1$) between speaker 2 (external loud speaker 903) and mic 3 (additional microphone 901) without headphone as a hear-through reference.

Step 1002: measure $\underline{Z}_{OE}$ using the acoustic impedance tube 100 as the reference termination.

Step 1003: measure $\underline{Z}_{OE}^{Hp}$ using the acoustic impedance tube 100 with ANR/ANC system (the ANR/ANC headphone 110). It should be noted, at the beginning, the feedback and feed-forward loop gain ($K_1$ and $K_2$) are zero.

Step 1004: calculate $Z_{HP}$ as the ratio between $|\underline{Z}_{OE}^{Hp}|$ and $|\underline{Z}_{OE}|$, and further calculate the OI based on the $Z_{HP}$. OI is a criterion to evaluate the performance of the ANR/ANC system. If OI is equal or close to zero, or blow a threshold defined by the manufacturer, the measurement is completed, there is no need to go to steps 1005-1009 anymore.

Step 1005: select frequency dependent weighting factor for the feedback filter $K_1$ 404. For example, if $Z_{HP}$ shows 10 dB boost at 100 Hz, want 10 dB of feedback loop desensitivity at that frequency.

Step 1006: measure transfer function ($H_2$) between speaker 2 (external loudspeaker 903) and mic 3 (additional microphone 901) with the headphone 110.

Step 1007: calculate the damping of the headphone (isolation curve) $H_{iso}=|H_2|/|H_1|$.

Step 1008: Configure the feed-forward loop gain $K_2$ to reduce headphone damping in the high frequencies and to ensure a natural own voice perception. For example, if $H_{iso}$ shows a 4 dB drop at 3 kHz, a first approximation will add 3 dB gain to the feed forward path.

Step 1009: apply $K_1$ and $K_2$ for the ANR/ANC circuit and go back to step 1003.

Figure 11:
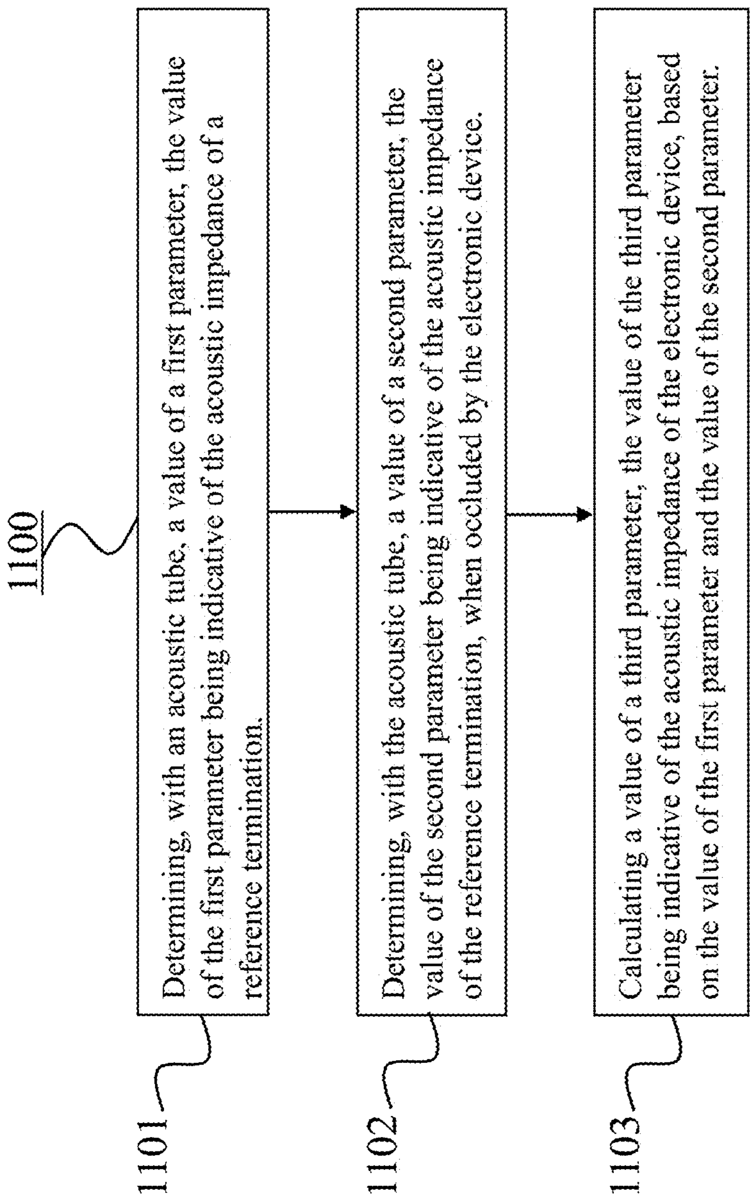
FIG. 11 schematically illustrates a method for evaluating an electronic device, according to various embodiments of the disclosure.

FIG. 11 shows a method 1100 according to an embodiment of the disclosure for evaluating an electronic device 110. The method 1100 may be carried out by the system 1, as it described above.

The method 1100 comprises a step 1101 of determining, with an acoustic tube, a value of a first parameter $\underline{Z}_{OE}$, the value of the first parameter $\underline{Z}_{OE}$ being indicative of the acoustic impedance of a reference termination 101.

The method 1100 further comprises a step 1102 of determining, with the acoustic tube, a value of a second parameter $\underline{Z}_{OE}^{Hp}$, the value of the second parameter $\underline{Z}_{OE}^{Hp}$ being indicative of the acoustic impedance of the reference termination 101, when occluded by the electronic device 110.

The method 1100 further comprises a step 1103 calculating a value of a third parameter $Z_{HP}$, the value of the third parameter $Z_{HP}$ being indicative of the acoustic impedance of the electronic device 110, based on the value of the first parameter $\underline{Z}_{OE}$ and the value of the second parameter $\underline{Z}_{OE}^{Hp}$.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A method for evaluating an electronic device, the method comprising:

determining, with an acoustic tube, a value of a first parameter, wherein the value of the first parameter is indicative of an acoustic impedance of a reference termination, and wherein the reference termination is one of: an open end of the acoustic tube, an artificial ear, or a dummy head;

determining, with the acoustic tube, a value of a second parameter, wherein the value of the second parameter is indicative of an acoustic impedance of the reference termination occluded by the electronic device; and calculating a value of a third parameter, wherein the value of the third parameter is indicative of an acoustic impedance of the electronic device, based on the value of the first parameter and the value of the second parameter.

2. The method according to claim 1, wherein:

the value of third parameter is calculated based on a ratio between the value of the first parameter and the value of the second parameter.

3. The method according to claim 1, the method further comprising:

calculating a value of a fourth parameter based on the value of the third parameter, wherein the value of the fourth parameter is an Occlusion Index, OI, that represents a strength of the acoustic impedance of the electronic device with respect to an occlusion effect.

4. The method according to claim 1, wherein:

the electronic device comprises: an Active Noise Cancellation, ANC, headphone; or an Active Noise Reduction, ANR, headphone.

5. The method according to claim 3, the method further comprising:

selecting, based on the value of the fourth parameter, a frequency dependent weighting factor, K1, for a feedback filter of the electronic device responsive to determining that the value of the fourth parameter is larger than a threshold value;

applying the K1 to the feedback filter of the electronic device; and recalculating the value of the fourth parameter after applying the K1 to the feedback filter of the electronic device.

6. The method according to claim 5, wherein:

selecting the K1, applying the K1, and recalculating the value of the fourth parameter is performed iteratively until the recalculated value of the fourth parameter is equal to or smaller than a threshold value.

7. The method according to claim 3, wherein the electronic device includes at least one loudspeaker configured to generate a signal, at least one microphone configured to capture the generated signal from the loudspeaker, and an Active Noise Cancellation, ANC, circuit or an Active Noise Reduction, ANR, circuit configured to generate a noise cancelation signal, the method further comprising:

measuring a first transfer function value between an external loudspeaker and an additional microphone, wherein the additional microphone is placed inside the reference termination, and wherein the first transfer function value is measured by producing a signal using the external loud speaker and capturing the signal by the additional microphone;

measuring a second transfer function value between the external loudspeaker and the additional microphone, wherein the second transfer function value is measured by reproducing the signal using the external loud speaker and capturing the reproduced signal by the additional microphone; and calculating a value of a fifth parameter, wherein the value of the fifth parameter is indicative of a damping of the electronic device, based on the first transfer function value and the second transfer function value.

8. The method according to claim 7, the method further comprising:

selecting, responsive to determining that the value of the fourth parameter is larger than a threshold value, a frequency dependent weighting factor, K2, for a feedforward filter of the electronic device, based on the value of the fifth parameter;

applying the K2 to the feedforward filter of the electronic device; and recalculating the value of the fourth parameter and the value of the fifth parameter, after applying the K2 to the feedforward filter of the electronic device.

9. The method according to claim 8, wherein:

selecting the K2, applying the K2, and recalculating the value of the fourth parameter and the value of the fifth parameter is performed iteratively until the recalculated value of the fourth parameter is equal to or smaller than the threshold value.

10. A system for evaluating an electronic device, the system comprising:

an acoustic tube; and a processing unit configured to:

determine a value of a first parameter, wherein the value of the first parameter is indicative of an acoustic impedance of an open end of the acoustic tube;

determine a value of a second parameter, wherein the value of the second parameter is indicative of an acoustic impedance of the open end of the acoustic tube as occluded by the electronic device; and calculate a value of a third parameter, wherein the value of the third parameter is indicative of an acoustic impedance of the electronic device, based on the value of the first parameter and the value of the second parameter.

11. The system according to claim 10, wherein the electronic device includes:

at least one loudspeaker configured to generate a signal, at least one microphone configured to capture the generated signal from the loudspeaker, and an Active Noise Cancellation, ANC, circuit and/or an Active Noise Reduction, ANR, circuit configured to generate a noise cancelation signal.

12. The system according to claim 10, wherein:

the acoustic tube has a full audio band frequency range.

13. The system according to claim 11, further comprising:

an external loudspeaker configured to generate a signal;

an additional microphone configured to capture the generated signal, wherein the additional microphone is placed inside the acoustic tube at a predefined distance from the open end of the acoustic tube; and a damping measurement circuit configured to measure at least one of the first transfer function value or the second transfer function value.

14. The system according to claim 13, wherein:

the predefined distance between the additional microphone and the open end of the acoustic tube is smaller than 5 cm.

* * * * *